United States Patent [19]

Deutscher et al.

[11] 4,293,434
[45] Oct. 6, 1981

[54] LIQUID CRYSTAL COMPOUNDS

[75] Inventors: Hans-Joachim Deutscher, Halle; Herrmann Schubert, Nehlitz; Christina Seidel, Halle; Dietrich Demus, Halle; Horst Kresse, Halle, all of German Democratic Rep.

[73] Assignee: VEB Werk für Fernsehelektronik Berlin im VEB Kombinat Mikroelektronik, Berlin-Oberschöneweide, German Democratic Rep.

[21] Appl. No.: 11,952

[22] Filed: Feb. 13, 1979

Related U.S. Application Data

[63] Continuation-in-part of Ser. No. 877,557, Aug. 8, 1978, abandoned.

[51] Int. Cl.³ .......................... C09K 3/34; G02F 1/13
[52] U.S. Cl. .................... 252/299.63; 252/408; 260/465 D; 260/463; 350/349; 350/350 R; 350/350 S; 560/61; 560/62; 560/65; 560/73; 560/106; 560/107; 560/126; 560/1
[58] Field of Search ................ 252/299, 408; 350/350, 350/349, 346; 560/60, 61, 62, 64, 65, 66, 73, 106, 103, 107, 125, 126, 179, 187; 260/465 D, 463

[56] References Cited

U.S. PATENT DOCUMENTS

| | | | |
|---|---|---|---|
| 3,876,286 | 4/1975 | Deutscher et al. | 252/299 |
| 3,915,883 | 10/1975 | Van Meter et al. | 252/299 |
| 3,953,491 | 4/1976 | Steinstrasser et al. | 252/299 |
| 4,001,137 | 1/1977 | Steinstrasser | 252/299 |
| 4,099,856 | 7/1978 | Weissflog et al. | 252/299 |
| 4,113,647 | 9/1978 | Coates et al. | 252/299 |
| 4,149,413 | 4/1979 | Gray et al. | 252/299 |
| 4,154,697 | 5/1979 | Eidenschink et al. | 252/299 |
| 4,195,916 | 4/1980 | Coates et al. | 252/299 |
| 4,202,791 | 5/1980 | Sato et al. | 252/299 |

FOREIGN PATENT DOCUMENTS

| | | | |
|---|---|---|---|
| 2502904 | 7/1975 | Fed. Rep. of Germany | 252/299 |
| 2800553 | 7/1979 | Fed. Rep. of Germany | 252/299 |
| 105701 | 5/1974 | German Democratic Rep. | 252/299 |
| 2752975 | 8/1978 | German Democratic Rep. | 252/299 |

OTHER PUBLICATIONS

Dewar, M. J. S., et al., J. Am. Chem. Soc., vol. 92, No. 6, pp. 1582-1586 (1970).

*Primary Examiner*—Teddy S. Gron
*Attorney, Agent, or Firm*—Michael J. Striker

[57] ABSTRACT

The invention describes nematic compositions for electrooptical devices for modulation of the transmitted or incident light and for the rendition of numbers, symbols and images as orientation in the spectroscopy and gas chromatography. The compositions comprise, liquid crystalline compounds such as dyestuffs and at least one of the compound having the following general formula:

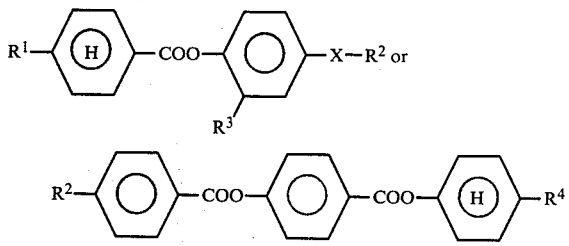

wherein $R^1 = C_nH_{2n+1}$, n = 1 to 9

$R^2 = C_nH_{2n+1}-$, $C_nH_{2n+1}O-$, $C_nH_{2n+1}COO-$, $C_nH_{2n+1}OCOO-$, n = 1 to 9   $-CN-Cl, -Br, -C_2H_4CN$

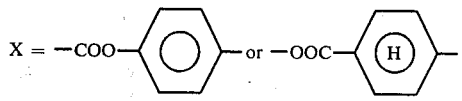

$R^3 =$ H, $-CH_3$, $-C_2H_5$, $-Cl$, $-Br$, $-CN$, $-CH_2CH$ $R^4 = C_nH_{2n+1}-$, $C_nH_{2n+1}O-$   n = 1 to 9.

2 Claims, No Drawings

LIQUID CRYSTAL COMPOUNDS

CROSS-REFERENCE TO RELATED APPLICATIONS

This application is a continuation-in-part of the application Ser. No. 877,557, now abandoned. The latter application was awarded a filing date of Aug. 8, 1978.

BACKGROUND OF THE INVENTION

The invention relates to novel nematic liquid crystal compounds for electrooptical devices for modulation of the transmitted or incident light and for the rendition of numbers, symbols and images; further as orientation medium in the spectroscopy and gas chromatography.

It is known that nematic liquid crystal compounds can be rearranged in electrical fields and are thus useful for the making of electrooptical devices (M. Tobias. International Handbook of Liquid Crystal Displays 1975-1976 Ovum Ltd. London 1976).

Liquid crystals are also highly useful as orientation medium in the spectroscopy in the visible and near UV field, in the nuclear magnetic resonance spectroscopy as well as in the gas chromatography (G. Meier, T. Sachmann, J. G. Grabmaier, Applications of Liquid Crystals Springer-Verlag, Berlin-Heidelberg-New York 1975).

Heretofore there were used for the mentioned purposes in many cases the substituted benzoic acid phenylesters (economic patent No. 86,269 of the German Democratic Republic; Steinsträsser, Z. Naturforsch, 27b, 774 (1972)). These esters possess a relatively high viscosity which causes undesirably long starting and shut-off times, particularly at low temperatures when used in electro-optical devices. The clearing points are partly undesirably low and the melting points have values which are too high.

OBJECT OF THE INVENTION

The object of the invention is the use of novel liquid crystal compounds which possess a high chemical and thermal stability, no color of their own in the visible spectral range, sufficiently high clearing points with adequately low melting point, and low viscosity values. Use is in electro-optical devices for modulating the transmittant or incident light and for rendering numbers, symbols, and pictures, and furthermore as orientation medium in the spectroscopy and gas chromatography.

SUMMARY OF THE INVENTION

It has been found that nematic liquid crystal compounds can be used for the purposes later listed which have the following general formulae

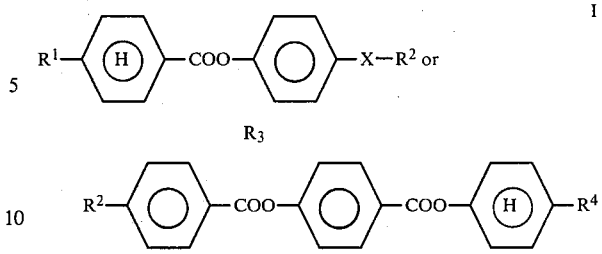

wherein $R^1 = C_nH_{2n+1}$, n being 1 to 9
$R^2 = C_nH_{2n+1}-, C_nH_{2n+1}O-, C_nH_{2n+1}COO-,$
$\qquad C_nH_{2n+1}OCOO-$ n being 1 to 9
$-CN, -Cl, -Br, -C_2H_4CN$

$R^3 = H, -CH_3, -C_2H_5, -Cl, -Br, -CN, -CH_2CN$
$R^4 = C_nH_{2n+1}-, C_nH_{2n+1}O-$ where n =

1 to 9 and ⟨H⟩ represents cyclohexane.

The uses in electro-optical devices for modulating the transmitted or incident light and for rendition of numbers, symbols and images, furthermore as orientation medium in the spectroscopy and gas chromatography. The compounds have high chemical and thermal stability, have no color of their own in the visible spectral range, have high clear points at sufficiently low melting points and have low viscosity values.

By making mixtures, particularly eutectic mixtures, the melting point can still further be lowered and at little changed clear points it is possible to increase substantially the operating temperature ranges. The conversion temperatures of the compounds of the invention are found in the following Tables 1 to 3.

By adding dyes in concentration up to 5% the mixtures can be colored and are then useful for electrooptical structural elements on the basis of the guest-host effect. As dyes can be used for instance metallic red or indophenol blue.

As liquid crystalline compounds are for instance useful 4-n-propyl-cyclohexane-carboxylic acid-4-cyanophenylester or 4-methoxybenzoic acid-4-n-hexyloxyphenylester.

EXAMPLES

TABLE I

| No. | $R^1$ | $R^2$ | $R^3$ | Fp. | conversion sm-sm | sm-nem. | clear point |
|---|---|---|---|---|---|---|---|
| 1 | $CH_3-$ | $CH_3O-$ | H | 107 | — | — | 229 |
| 2 | $CH_3-$ | $C_4H_9O-$ | H | 81 | — | — | 197,5 |
| 3 | $CH_3-$ | $C_7H_{15}O-$ | H | 81 | — | — | 187 |
| 4 | $CH_3-$ | $C_8H_{17}O-$ | H | 67 | — | — | 170 |
| 5 | $CH_3-$ | $C_4H_9-$ | H | 73 | — | — | 159 |

TABLE I-continued

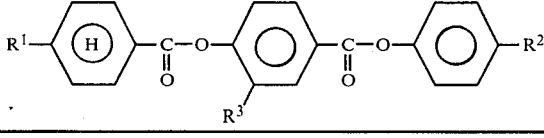

| No. | R₁ | R₂ | R₃ | Fp. | conversion sm-sm | sm-nem. | clear point |
|---|---|---|---|---|---|---|---|
| 6 | $C_2H_5-$ | $CH_3-$ | H | 62 | — | — | 188 |
| 7 | $C_2H_5-$ | $CH_3O-$ | H | 80 | — | — | 245 |
| 8 | $C_2H_5-$ | $C_4H_9-$ | H | 66 | — | — | 180 |
| 9 | $C_2H_5-$ | $C_7H_{15}O-$ | H | 63 | — | — | 184 |
| 10 | $C_2H_5-$ | $C_8H_{17}O-$ | H | 58 | — | — | 175 |
| 11 | $C_3H_7-$ | $CH_3O-$ | H | 94 | — | — | 245 |
| 12 | $C_3H_7-$ | $C_2H_5O-$ | H | 112 | — | — | 238 |
| 13 | $C_3H_7-$ | $C_4H_9O-$ | H | 75 | — | — | 222 |
| 14 | $C_3H_7-$ | $C_5H_{11}O-$ | H | 67,5 | — | — | 214 |
| 15 | $C_3H_7-$ | $C_7H_{15}O-$ | H | 75 | — | (70) | 203 |
| 16 | $C_3H_7-$ | $CH_3-$ | H | 72–73 | — | — | 240 |
| 17 | $C_3H_7-$ | $C_4H_9-$ | H | 74–75 | — | 83 | 198 |
| 18 | $C_4H_9-$ | $CH_3O-$ | H | 121 | — | — | 236 |
| 19 | $C_4H_9-$ | $C_2H_5O-$ | H | 104 | — | — | 231 |
| 20 | $C_4H_9-$ | $C_4H_9O-$ | H | 74–75 | — | 88 | 218 |
| 21 | $C_4H_9-$ | $C_5H_{11}O-$ | H | 71–72 | — | 110 | 206,5 |
| 22 | $C_4H_9-$ | $C_7H_{15}O-$ | H | 66–67 | — | 126 | 196 |
| 23 | $C_4H_9-$ | $CH_3-$ | H | 78 | — | — | 208 |
| 24 | $C_4H_9-$ | $C_3H_7-$ | H | 82 | — | 92 | 206 |
| 25 | $C_4H_9-$ | $C_4H_9-$ | H | 65 | — | 115 | 192 |
| 26 | $C_5H_{11}-$ | $CH_3O-$ | H | 97–98 | — | (59) | 237 |
| 27 | $C_5H_{11}-$ | $C_2H_5O-$ | H | 103 | — | — | 236 |
| 28 | $C_5H_{11}-$ | $C_4H_9O-$ | H | 85 | (70) | 124 | 216 |
| 29 | $C_5H_{11}-$ | $C_7H_{15}O-$ | H | 66 | 88 | 150 | 202 |
| 30 | $C_5H_{11}-$ | $CH_3-$ | H | 56–57 | — | 90 | 215 |
| 31 | $C_5H_{11}-$ | $C_3H_7-$ | H | 78 | — | 121 | 209 |
| 32 | $C_5H_{11}-$ | $C_4H_9-$ | H | 78–79 | — | 136 | 195 |
| 33 | $C_4H_9-$ | NC— | H | 98–99 | — | — | 255 |
| 34 | $CH_3-$ | $C_7H_{15}O-$ | $C_2H_5-$ | 47,5 | — | — | 88 |
| 35 | $C_3H_7-$ | $C_7H_5O-$ | $C_2H_5-$ | 63–62 | — | — | 123 |
| 36 | $C_5H_{11}-$ | $C_7H_{15}O-$ | $C_2H_5-$ | 51–52 | — | — | 120 |
| 37 | $C_6H_{13}-$ | $C_7H_{15}O-$ | $C_2H_5-$ | 44–45 | — | — | 116,5 |
| 38 | $CH_3-$ | $C_7H_{15}O-$ | Cl— | 80 | — | — | 142 |
| 39 | $C_2H_5-$ | $C_4H_9O-$ | Cl— | 78 | — | — | 175 |
| 40 | $C_2H_5-$ | $C_7H_{15}O-$ | Cl— | 73 | — | — | 151 |
| 41 | $C_4H_9-$ | $C_4H_9O-$ | Cl— | 77–78 | — | — | 188 |
| 42 | $C_3H_7-$ | $C_7H_{15}O-$ | Cl— | 73 | — | — | 174 |
| 43 | $C_4H_9-$ | $C_7H_{15}O-$ | Cl— | 73–74 | — | — | 166 |
| 44 | $C_5H_{11}-$ | $C_7H_{15}O-$ | Cl— | 66–67 | — | — | 154 |

( ) monotropic conversion

TABLE II

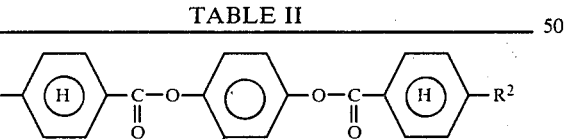

| No. | R¹ | R² | R³ | Fp. | clear point |
|---|---|---|---|---|---|
| 45 | $C_2H_5-$ | $C_2H_5-$ | $CH_3-$ | 92 | 142,5 |
| 46 | $C_4H_9-$ | $C_4H_9-$ | $CH_3-$ | 88 | 179–180 |
| 47 | $C_5H_{11}-$ | $C_5H_{11}-$ | $CH_3-$ | 76 | 185 |
| 48 | $CH_3-$ | $CH_3-$ | H— | 68–69 | (48) |
| 49 | $C_3H_7-$ | $C_3H_7-$ | $C_2H_5-$ | 47 | 130 |
| 50 | $C_4H_9-$ | $C_4H_9-$ | $C_2H_5-$ | 50–51 | 129 |
| 51 | $C_5H_{11}-$ | $C_5H_{11}-$ | $C_2H_5-$ | 42–43 | 133–134 |
| 52 | $C_6H_{13}-$ | $C_6H_{13}-$ | $C_2H_5-$ | 53 | 122 |
| 53 | $C_3H_7-$ | $C_3H_7-$ | Cl— | 73 | 186 |
| 54 | $C_4H_9$ | $C_4H_9$ | Cl— | 83 | 181 |
| 55 | $C_5H_{11}$ | $C_5H_{11}$ | Cl— | 69–70 | 190 |

TABLE III

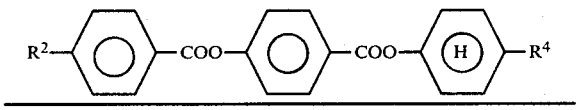

| No. | R² | R⁴ | Fp. | conversion sm-nem. | clear point |
|---|---|---|---|---|---|
| 56 | $C_4H_9-$ | $C_4H_9-$ | 68 | — | 161 |
| 57 | $C_6H_{13}-$ | $CH_3-$ | 60 | — | 105 |
| 58 | $C_6H_{13}-$ | $C_5H_{11}-$ | 73 | — | 146 |
| 59 | $C_2H_5-$ | $C_4H_9O-$ | 120 | — | 141 |
| 60 | $CH_3O-$ | $C_4H_9-$ | 110 | — | 212 |
| 61 | $C_2H_5O-$ | $C_4H_9-$ | 108 | — | 212 |
| 62 | $C_6H_{13}O-$ | H | 125 | 218 | 255 |
| 63 | $C_6H_{13}O-$ | $CH_3-$ | 50 | 63 | 151 |
| 64 | $C_6H_{13}O-$ | $C_4H_9-$ | 72 | 82 | 200 |
| 65 | $C_6H_{13}O-$ | $C_4H_9O-$ | 66 | 173 | 183 |
| 66 | $CH_3O-$ | $C_4H_9O-$ | 110 | — | 145 |
| 67 | $C_2H_5O-$ | $C_4H_9O-$ | 95 | — | 150 |

The following will illustrate the making of the compounds of the invention and their properties.

A. Reaction Scheme

Compounds where the group X in formula I is

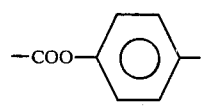

are produced by reacting 4-n-alkycyclohexanoylchlorides with the substituted 4-hydroxybenzoic acid phenylester according to the following reaction scheme

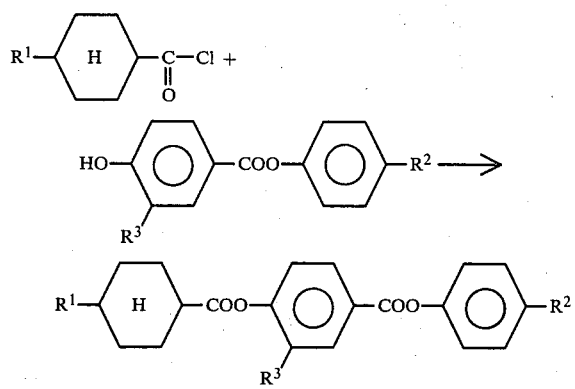

The reaction is carried out in pyridine at room temperature; a purification of the compounds is obtained by repeated recrystallization from methanol.

EXAMPLE 1

0.02 mol (3.5 g) of 4-ethylcyclohexanecarboxylic acid chloride were dissolved in 20 ml of pyridine. 0.02 mol (6.6 g) of 4-hydroxybenzoic acid-4-heptyloxyphenylester dissolved in 20 ml pyridine were then added. After vigorous stirring the mixture was maintained for 12 to 15 hours at a temperature of +5° C. which caused the formed ester and the pyridinium chloride to precipitate. The mixture was then poured onto 200 g of ice together with 8 ml of concentrated sulfuric acid. The precipitate formed was extracted with ether, washed with a sodium hydroxide solution and water, dried and concentrated by evaporation. After three-fold recrystallization from methanol there were obtained 6.5 g=70% of the theoretical amount of the compound No. 9 of the above table.

The point of the compound was at 63° C. and the clear point was at 184° C.

EXAMPLE 2

In an analogous manner to Example 1 and again to obtain a compound having the group

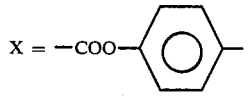

the compound No. 37 of the above table is reacted in pyridine at room temperature. The compound is purified by repeated recrystallization from methanol

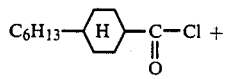

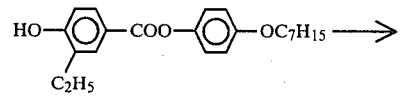

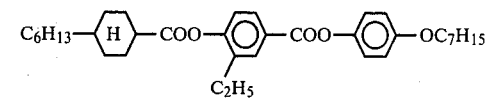

There is obtained a yield of 65%. The point is at 44° to 45° C. and the clear point at 116.5° C.

B. Reaction Scheme

Compounds with the group

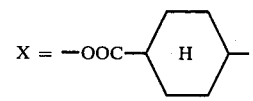

are made by reaction of 4-n-alkylcyclohexanoylchlorides with the 2-substituted hydroquinones according to the following reaction scheme

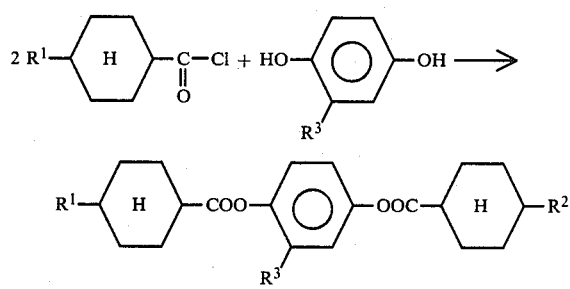

The reaction is carried out in pyridine at room temperature; a purification of the compounds is obtained by repeated recrystallization from methanol.

EXAMPLE 3

0.04 mol (9.2 g) of 4-n-hexylcyclohexanocarboxylic acid chloride were dissolved in 40 ml pyridine. To the solution (0.02 mol (2.8 g) of 2-ethylhydroquinone dissolved in 25 ml pyridine were added. The mixture was subjected to stirring and was kept for 12 to 15 hours at +5° C. which caused the ester and the pyridinium chloride to precipitate. The mixture was then poured onto 300 g of ice together with 10 ml of concentrated sulfuric acid and was extracted with ether. The ester solution was washed with a salt solution and water, dried and subjected to concentration by evaporation. After three times recrystallization there were obtained 6.8 g=65% of the theoretical amount of the compound No. 52 of the above table.

The point of the compound was 53° C. and the clear point was at 122° C.

EXAMPLE 4

In analogous manner to Example 3 and also in order to obtain a compound with the group $$X = -OOC-\underset{}{\underbrace{}}\text{ }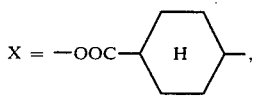,$$

the compound No. 47 of the above table is reacted in pyridine at room temperature. The compound is purified by repeated recrystallization from methanol.

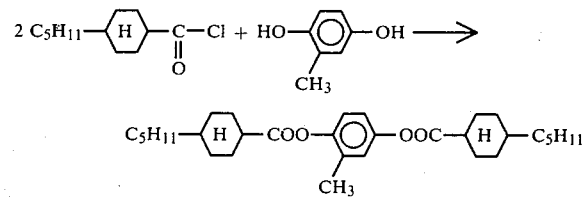

The yield is 68%. The point is at 76° C. and the clear point at 185° C.

EXAMPLE 5

The compound No. 51 of the above table by way of example shows the dynamic scatter effect in the conventional electro-optical devices. At 50 Hz alternating voltage a threshold voltage was obtained of $U_o = 7.5$ V; at direct current the threshold voltage was $U_o = 5.5$ V. Good contrasts of 20:1 or higher were obtained at voltages which amounted to the 2.5 value of $U_o$. Even with use of voltages up to 60 V no decomposition phenomena were observed.

EXAMPLE 6

The compound No. 57 possesses positive dielectric anistropy and is suitable for electro-optical devices on the basis of the field effects (Fresdericksz-rearrangement, Schadt-Helfrich-effect, guest-host-effect). In the Schadt-Helfrich-cell (twist-cell) a threshold voltage was obtained of 4 V/50 Hz; the complete reorientation was obtained at 8 V/50 Hz.

EXAMPLE 7

The compound No. 57 was mixed with 1% methyl red and an orienting composition was formed with a horizontal layer. Upon transmission through the compound of polarized light the typical absorption band of the methyl red was obtained if the polarization plane of the light was arranged parallel to the preferential direction of the nematic layer. On the other hand no absorption was ascertainable if the polarization plane of the light was arranged vertically to the preferential direction of the nematic layer. This result of the dichroismus of the dyestuff methyl red is based on the specifically directed incorporation of the dyestuff molecules in accord with the orientation of the nematic matrix. Since the compounds of the invention have no absorption in the visible spectral range they can particularly be used for spectroscopy in this range. By means of electrical fields (5 V/50 Hz) the initially horizontal layer is raised up in electro-optical structural elements and there is thereby a color shift obtained from red to faint pink.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Nematic composition for electro-optical devices for the modulation of transmitted or incident light and the rendition of numbers, symbols and images, or as orientation medium in spectroscopy and gas chromatography comprising liquid crystalline compounds, non-liquid crystalline dyestuffs and at least one compound having the following general formula:

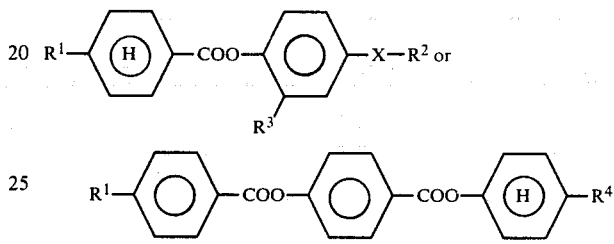

wherein
$R^1$ equals $C_nH_{2n+1}$ with n being 1 to 9;
$R^2$ equals $C_nH_{2n+1}-$ or $C_nH_{2n+1}O-$ when X is

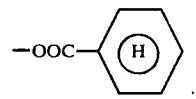

and $R^2$ equals $C_nH_{2n+1}O-$ or $-CN$ when X is

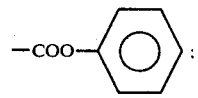;

$R^3$ equals $-CH_3$, $-C_2H_5$, $-Cl$ or $-Br$; and
R and $R^4$ each equals $C_nH_{2n+1}$ or $C_nH_{2n+1}O-$, with n being 1 to 9 and

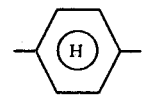

represents cyclohexyl.

2. The compound having the formula:

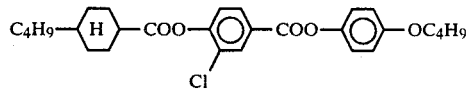

* * * * *